(12) United States Patent
Tsai et al.

(10) Patent No.: US 11,048,069 B2
(45) Date of Patent: Jun. 29, 2021

(54) THREE-PIECE INFRARED SINGLE WAVELENGTH PROJECTION LENS SYSTEM

(71) Applicant: NEWMAX TECHNOLOGY CO., LTD., Tai-Chung (TW)

(72) Inventors: Fei-Hsin Tsai, Tai-Chung (TW); Ching-Yun Huang, Tai-Chung (TW)

(73) Assignee: NEWMAX TECHNOLOGY CO., LTD., Tai-Chung (TW)

(*) Notice: Subject to any disclaimer, the term of this patent is extended or adjusted under 35 U.S.C. 154(b) by 541 days.

(21) Appl. No.: 15/821,841

(22) Filed: Nov. 23, 2017

(65) Prior Publication Data

US 2019/0154976 A1 May 23, 2019

(51) Int. Cl.
*G02B 13/14* (2006.01)
*G02B 13/00* (2006.01)
*G02B 9/12* (2006.01)
*G02B 1/04* (2006.01)
*G01S 1/00* (2006.01)

(52) U.S. Cl.
CPC .............. *G02B 13/14* (2013.01); *G02B 9/12* (2013.01); *G02B 13/008* (2013.01); *G02B 13/0035* (2013.01); *G01S 1/00* (2013.01); *G02B 1/041* (2013.01)

(58) Field of Classification Search
CPC ...... G02B 13/14; G02B 13/146; G02B 13/18; G02B 13/003; G02B 13/0035; G02B 13/0062; G02B 5/208; G02B 5/226; G02B 1/041; G02B 1/00; G02B 3/00; G02B 9/10; G02B 9/06; G02B 15/173; G02B 13/005; G02B 19/009; G02B 27/0955; H04N 5/33; H01L 2924/0002; H01L 2924/00; H01L 27/14625; H01L 25/167
USPC ................................ 359/356, 357, 355, 350
See application file for complete search history.

(56) References Cited

U.S. PATENT DOCUMENTS

| 9,291,798 | B2 * | 3/2016 | Sekine | G02B 9/62 |
| 10,613,302 | B2 * | 4/2020 | Chen | G02B 13/0045 |
| 2010/0246026 | A1 * | 9/2010 | Nanba | G02B 15/177 359/682 |
| 2016/0131899 | A1 * | 5/2016 | Jo | G02B 5/005 348/294 |
| 2018/0031805 | A1 * | 2/2018 | Lai | G02B 13/008 |

(Continued)

FOREIGN PATENT DOCUMENTS

CN 105807419 A * 7/2016

*Primary Examiner* — William R Alexander
*Assistant Examiner* — Tamara Y. Washington
(74) *Attorney, Agent, or Firm* — Bruce Stone LLP; Joseph A. Bruce

(57) ABSTRACT

A three-piece infrared single wavelength projection lens system includes, in order from an image side to an image source side: a first lens element with a positive refractive power; a second lens element with a refractive power; a third lens element with a positive refractive power; a stop disposed before an image source-side surface of the first lens element or between the image source-side surface of the first lens element and an image source-side surface of the second lens element; and the first lens element or the second lens element is made of glass. Such arrangements can provide a three-piece infrared single wavelength projection lens system with better image sensing function.

16 Claims, 10 Drawing Sheets

(56) References Cited

U.S. PATENT DOCUMENTS

2018/0031806 A1* 2/2018 Lai .......................... G02B 9/12
2019/0179123 A1* 6/2019 Chen ................... H04N 5/2253

* cited by examiner

THREE-PIECE INFRARED SINGLE WAVELENGTH PROJECTION LENS SYSTEM

BACKGROUND OF THE INVENTION

Field of the Invention

The present invention relates to a projection lens system, and more particularly to a miniaturized three-piece infrared single wavelength projection lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY OF THE INVENTION

The primary objective of the present invention is to provide a three-piece infrared single wavelength projection lens system with better image sensing function.

Therefore, a three-piece infrared single wavelength projection lens system in accordance with the present invention comprises, in order from an image side to an image source side: a first lens element with a positive refractive power having an image-side surface being convex near an optical axis; a second lens element with a refractive power having an image-side surface being convex near the optical axis; a third lens element with a positive refractive power having an image-side surface being concave near the optical axis and an image source-side surface being convex near the optical axis, at least one of the image-side surface and the image source-side surface of the third lens element being aspheric; a stop disposed before an image source-side surface of the first lens element or between the image source-side surface of the first lens element and an image source-side surface of the second lens element; and wherein the first lens element or the second lens element is made of glass.

Preferably, a focal length of the three-piece infrared single wavelength projection lens system is f, a focal length of the first lens element and the second lens element combined is f12, and they satisfy the relation: 0.8<f/f12<1.5. Therefore, appropriate refractive powers of the first and second lens elements can obtain a wide field of view and maintain the objective of miniaturization of the system.

Preferably, the focal length of the three-piece infrared single wavelength projection lens system is f, a focal length of the second lens element and the third lens element combined is f23, and they satisfy the relation: 0.1<f/f23<1.3, so that the shortening of the total length of the system and the correction of aberration can be balanced.

Preferably, a focal length of the first lens element is f1, a focal length of the second lens element is f2, and they satisfy the relation: −0.5<f1/f2<0.7, so that the refractive power of the first lens element and the second lens element are more suitable, it will be favorable to avoid the excessive increase of aberration of the system.

Preferably, the focal length of the second lens element is f2, a focal length of the third lens element is f3, and they satisfy the relation: −2.6<f2/f3<18.2, so that the refractive power of the second lens element and the third lens element are more balanced, it will be favorable to correct the aberration of the system and reduce the sensitivity of the system.

Preferably, the focal length of the first lens element is f1, the focal length of the third lens element is f3, and they satisfy the relation: 0.1<f1/f3<1.8, so that the refractive power of the first lens element can be distributed effectively, so as to reduce the sensitivity of the three-piece infrared single wavelength projection lens system.

Preferably, the focal length of the first lens element is f1, the focal length of the second lens element and the third lens element combined is f23, and they satisfy the relation: 0.1<f1/f23<1.3, so that the resolution can be improved evidently.

Preferably, the focal length of the first lens element and the second lens element combined is f12, the focal length of the third lens element is f3, and they satisfy the relation: 0.2<f12/f3<1.4, so that the resolution can be improved evidently.

Preferably, a radius of curvature of the image-side surface of the first lens element is R1, a radius of curvature of the image source-side surface of the first lens element is R2, and they satisfy the relation: −0.8<R1/R2<1.1, which can reduce the spherical aberration and astigmatism of the three-piece infrared single wavelength projection lens system.

Preferably, a radius of curvature of the image-side surface of the second lens element is R3, a radius of curvature of the image source-side surface of the second lens element is R4, and they satisfy the relation: −1.7<R3/R4<1.9, which can reduce the spherical aberration and astigmatism of the three-piece infrared single wavelength projection lens system.

Preferably, a radius of curvature of the image-side surface of the third lens element is R5, a radius of curvature of the image source-side surface of the third lens element is R6, and they satisfy the relation: 0.4<R5/R6<1.2, which can reduce the spherical aberration and astigmatism of the three-piece infrared single wavelength projection lens system.

Preferably, a central thickness of the first lens element along the optical axis is CT1, a central thickness of the second lens element along the optical axis is CT2, and they satisfy the relation: 0.3<CT1/CT2<1.8, which is favorable to the formation and homogeneity of lenses.

Preferably, the central thickness of the second lens element along the optical axis is CT2, a central thickness of the third lens element along the optical axis is CT3, and they satisfy the relation: 0.2<CT2/CT3<1.0, so that the image quality and the sensitivity of the system can be balanced properly.

Preferably, the central thickness of the first lens element along the optical axis is CT1, the central thickness of the third lens element along the optical axis is CT3, and they satisfy the relation: 0.1<CT1/CT3<1.1, which is favorable to the formation and homogeneity of lenses.

Preferably, the focal length of the three-piece infrared single wavelength projection lens system is f, a distance from the image-side surface of the first lens element to the image plane along the optical axis is TL, and they satisfy the relation: 0.7<f/TL<1.2, it will be favorable to maintain the objective of miniaturization of the three-piece infrared single wavelength projection lens system, which can be used in thin electronic products.

Preferably, a refractive index of the first lens element or the second lens element which is made of glass is nglass, a refractive index of the first lens element or the second lens element which is made of plastic is nplastic, and they satisfy the relations: nglass>1.7 and nplastic>1.6. Glass lens element provides greater refractive index, which can increase the refractive power of the lens element.

Preferably, an Abbe number of the first lens element or the second lens element which is made of glass is Vglass, an Abbe number of the first lens element or the second lens element which is made of plastic is Vplastic, and they satisfy the relation: 23<Vglass−Vplastic<43, it will be favorable to match and reconcile the lens elements of the three-piece infrared single wavelength projection lens system, which can correct the chromatic aberration of the system effectively, so as to provide better aberration balance ability.

The present invention will be presented in further details from the following descriptions with the accompanying drawings, which show, for purpose of illustrations only, the preferred embodiments in accordance with the present invention.

DETAILED DESCRIPTION OF THE PREFERRED EMBODIMENTS

Figure 1A:
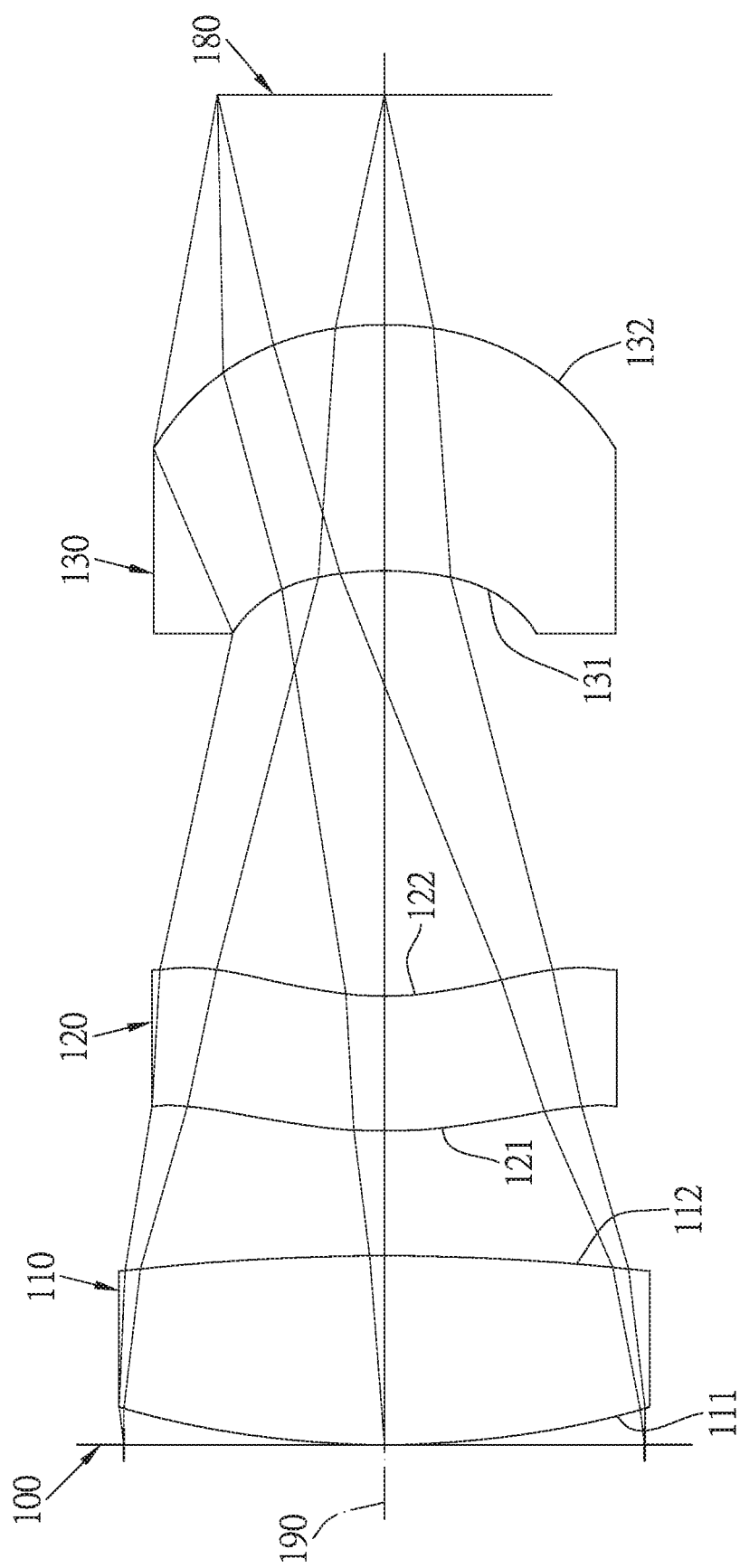
FIG. 1A shows a three-piece infrared single wavelength projection lens system in accordance with a first embodiment of the present invention.
Figure 1B:
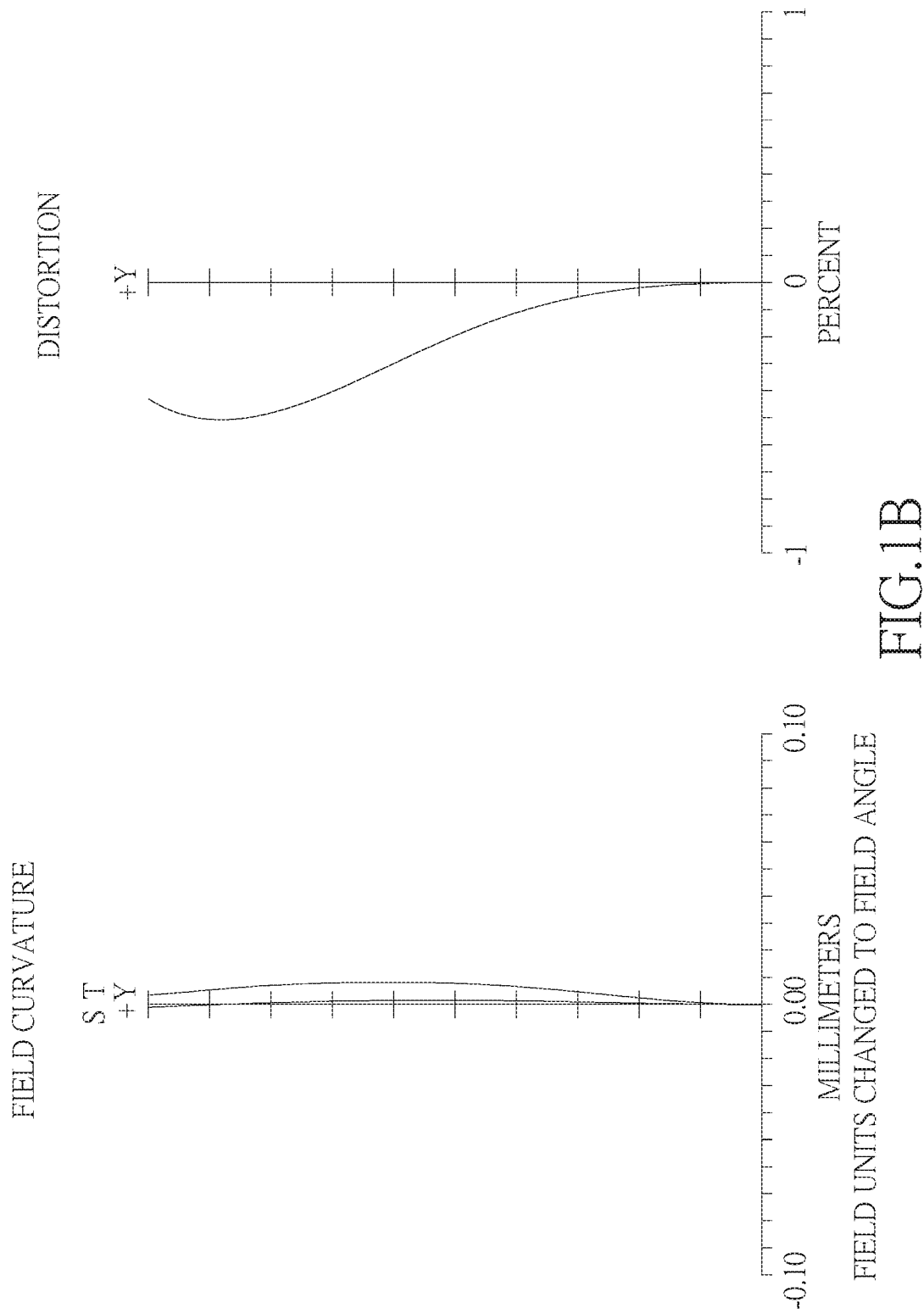
FIG. 1B shows the astigmatic field curve and the distortion curve of the first embodiment of the present invention.

Referring to FIGS. 1A and 1B, FIG. 1A shows a three-piece infrared single wavelength projection lens system in accordance with a first embodiment of the present invention, and FIG. 1B shows, in order from left to right, the astigmatic field curve and the distortion curve of the first embodiment of the present invention. A three-piece infrared single wavelength projection lens system in accordance with the first embodiment of the present invention comprises a stop 100 and a lens group. The lens group comprises, in order from an image side to an image source side: a first lens element 110, a second lens element 120, a third lens element 130, and an image source plane 180, wherein the three-piece infrared single wavelength projection lens system has a total of three lens elements with refractive power. The stop 100 is disposed before an image source-side surface 112 of the first lens element 110.

The first lens element 110 with a positive refractive power has an image-side surface 111 being convex near an optical axis 190 and the image source-side surface 112 being convex near the optical axis 190, and the first lens element 110 is made of glass.

The second lens element 120 with a negative refractive power has an image-side surface 121 being convex near the optical axis 190 and an image source-side surface 122 being concave near the optical axis 190, the image-side surface 121 and the image source-side surface 122 are aspheric, and the second lens element 120 is made of plastic material.

The third lens element 130 with a positive refractive power has an image-side surface 131 being concave near the optical axis 190 and an image source-side surface 132 being convex near the optical axis 190, the image-side surface 131 and the image source-side surface 132 are aspheric, and the third lens element 130 is made of plastic material.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present three-piece infrared single wavelength projection lens system, a focal length of the three-piece infrared single wavelength projection lens system is f, a f-number of the three-piece infrared single wavelength projection lens system is Fno, the three-piece infrared single wavelength projection lens system has a maximum view angle (field of view) FOV, and they satisfy the relations: f=3.33 mm; Fno=2.4; and FOV=15.05 degrees.

In the first embodiment of the present three-piece infrared single wavelength projection lens system, the focal length of the three-piece infrared single wavelength projection lens system is f, a focal length of the first lens element 110 and the second lens element 120 combined is f12, and they satisfy the relation: f/f12=1.117.

In the first embodiment of the present three-piece infrared single wavelength projection lens system, the focal length of the three-piece infrared single wavelength projection lens system is f, a focal length of the second lens element 120 and the third lens element 130 combined is f23, and they satisfy the relation: f/f23=0.451.

In the first embodiment of the present three-piece infrared single wavelength projection lens system, a focal length of the first lens element 110 is f1, a focal length of the second lens element 120 is f2, and they satisfy the relation: f1/f2=−0.378.

In the first embodiment of the present three-piece infrared single wavelength projection lens system, the focal length of the second lens element 120 is f2, a focal length of the third lens element 130 is f3, and they satisfy the relation: f2/f3=−1.528.

In the first embodiment of the present three-piece infrared single wavelength projection lens system, the focal length of the first lens element 110 is f1, the focal length of the third lens element 130 is f3, and they satisfy the relation: f1/f3=0.578.

In the first embodiment of the present three-piece infrared single wavelength projection lens system, the focal length of the first lens element 110 is f1, the focal length of the second lens element 120 and the third lens element 130 combined is f23, and they satisfy the relation: f1/f23=0.343.

In the first embodiment of the present three-piece infrared single wavelength projection lens system, the focal length of the first lens element 110 and the second lens element 120 combined is f12, the focal length of the third lens element 130 is f3, and they satisfy the relation: f12/f3=0.681.

In the first embodiment of the present three-piece infrared single wavelength projection lens system, a radius of curvature of the image-side surface 111 of the first lens element 110 is R1, a radius of curvature of the image source-side surface 112 of the first lens element 110 is R2, and they satisfy the relation: R1/R2=−0.415.

In the first embodiment of the present three-piece infrared single wavelength projection lens system, a radius of curvature of the image-side surface 121 of the second lens element 120 is R3, a radius of curvature of the image source-side surface 122 of the second lens element 120 is R4, and they satisfy the relation: R3/R4=1.482.

In the first embodiment of the present three-piece infrared single wavelength projection lens system, a radius of curvature of the image-side surface 131 of the third lens element 130 is R5, a radius of curvature of the image source-side surface 132 of the third lens element 130 is R4, and they satisfy the relation: R5/R6=1.098.

In the first embodiment of the present three-piece infrared single wavelength projection lens system, a central thickness of the first lens element 110 along the optical axis 190 is CT1, a central thickness of the second lens element 120 along the optical axis 190 is CT2, and they satisfy the relation: CT1/CT2=1.400.

In the first embodiment of the present three-piece infrared single wavelength projection lens system, the central thickness of the second lens element 120 along the optical axis 190 is CT2, a central thickness of the third lens element 130 along the optical axis 190 is CT3, and they satisfy the relation: CT2/CT3=0.548.

In the first embodiment of the present three-piece infrared single wavelength projection lens system, the central thickness of the first lens element 110 along the optical axis 190 is CT1, the central thickness of the third lens element 130 along the optical axis 190 is CT3, and they satisfy the relation: CT1/CT3=0.768.

In the first embodiment of the present three-piece infrared single wavelength projection lens system, the focal length of the three-piece infrared single wavelength projection lens system is f, a distance from the object-side surface 111 of the first lens element 110 to the image plane 180 along the optical axis 190 is TL, and they satisfy the relation: f/TL=0.936.

In the first embodiment of the present three-piece infrared single wavelength projection lens system, the first lens element 110 is made of glass, a refractive index of the first lens element 110 is nglass, the second lens element 120 and the third lens element 130 are made of plastic material, a refractive index of the second lens element 120 is nplastic, a refractive index of the third lens element 130 is nplastic, and they satisfy the relations: nglass=1.73 and nplastic=1.65.

In the first embodiment of the present three-piece infrared single wavelength projection lens system, the first lens element 110 is made of glass, an Abbe number of the first lens element 110 is Vglass, the second lens element 120 and the third lens element 130 are made of plastic material, an Abbe number of the second lens element 120 is Vplastic, an Abbe number of the third lens element 130 is Vplastic, and they satisfy the relation: Vglass−Vplastic=33.2, but not limited to 33.2, as long as Vglass−Vplastic is larger than 23 and less than 43.

The detailed optical data of the first embodiment is shown in table 1, and the aspheric surface data is shown in table 2.

TABLE 1

Embodiment 1
f(focal length) = 3.33 mm, Fno = 2.4, FOV = 15.05 deg.

| sur-face | | Curvature Radius | Thickness | Material | Index | Abbe # | Focal length |
|---|---|---|---|---|---|---|---|
| 0 | object | infinity | 350 | | | | |
| 1 | | infinity | 0 | | | | |
| 2 | stop | infinity | 0 | | | | |
| 3 | Lens 1 | 2.500 | 0.498 | glass | 1.73 | 54.7 | 2.530 |
| 4 | | −6.025 | 0.330 | | | | |
| 5 | Lens 2 | 1.378 (ASP) | 0.356 | plastic | 1.65 | 21.5 | −6.692 |
| 6 | | 0.930 (ASP) | 1.121 | | | | |

TABLE 1-continued

Embodiment 1
f(focal length) = 3.33 mm, Fno = 2.4, FOV = 15.05 deg.

| surface | | Curvature Radius | | Thickness | Material | Index | Abbe # | Focal length |
|---|---|---|---|---|---|---|---|---|
| 7 | Lens 3 | −0.992 | (ASP) | 0.649 | plastic | 1.65 | 21.5 | 4.380 |
| 8 | | −0.903 | (ASP) | 0.607 | | | | |
| 9 | Image source plane | infinity | | — | | | | |

TABLE 2

Aspheric Coefficients

| | surface | | | |
|---|---|---|---|---|
| | 5 | 6 | 7 | 8 |
| K: | −4.6908E+00 | −3.2991E−02 | 2.8181E+00 | 2.7061E−01 |
| A: | −1.6273E−01 | −9.4015E−01 | −1.4471E+00 | −5.8328E−01 |
| B: | −8.3129E−01 | −1.4073E+00 | −6.4094E−01 | 2.8911E−01 |
| C: | 1.4350E+00 | 3.6495E+00 | −3.8229E+01 | 1.1307E−01 |
| D: | −2.0041E+00 | −5.5030E+00 | 1.1881E+02 | −4.7051E+00 |
| E: | 9.7192E−02 | 3.6492E+00 | −4.3222E+02 | 1.1598E+01 |
| F: | | | −2.1819E+03 | −1.3429E+01 |

The units of the radius of curvature, the thickness and the focal length in table 1 are expressed in mm, the surface numbers 0-9 represent the surfaces sequentially arranged from the image-side to the image source-side along the optical axis. In table 2, k represents the conic coefficient of the equation of the aspheric surface profiles, and A, B, C, D, E, F . . . : represent the high-order aspheric coefficients. The tables presented below for each embodiment are the corresponding schematic parameter, aberration curves, and the definitions of the tables are the same as Table 1 and Table 2 of the first embodiment. Therefore, an explanation in this regard will not be provided again.

Figure 2A:
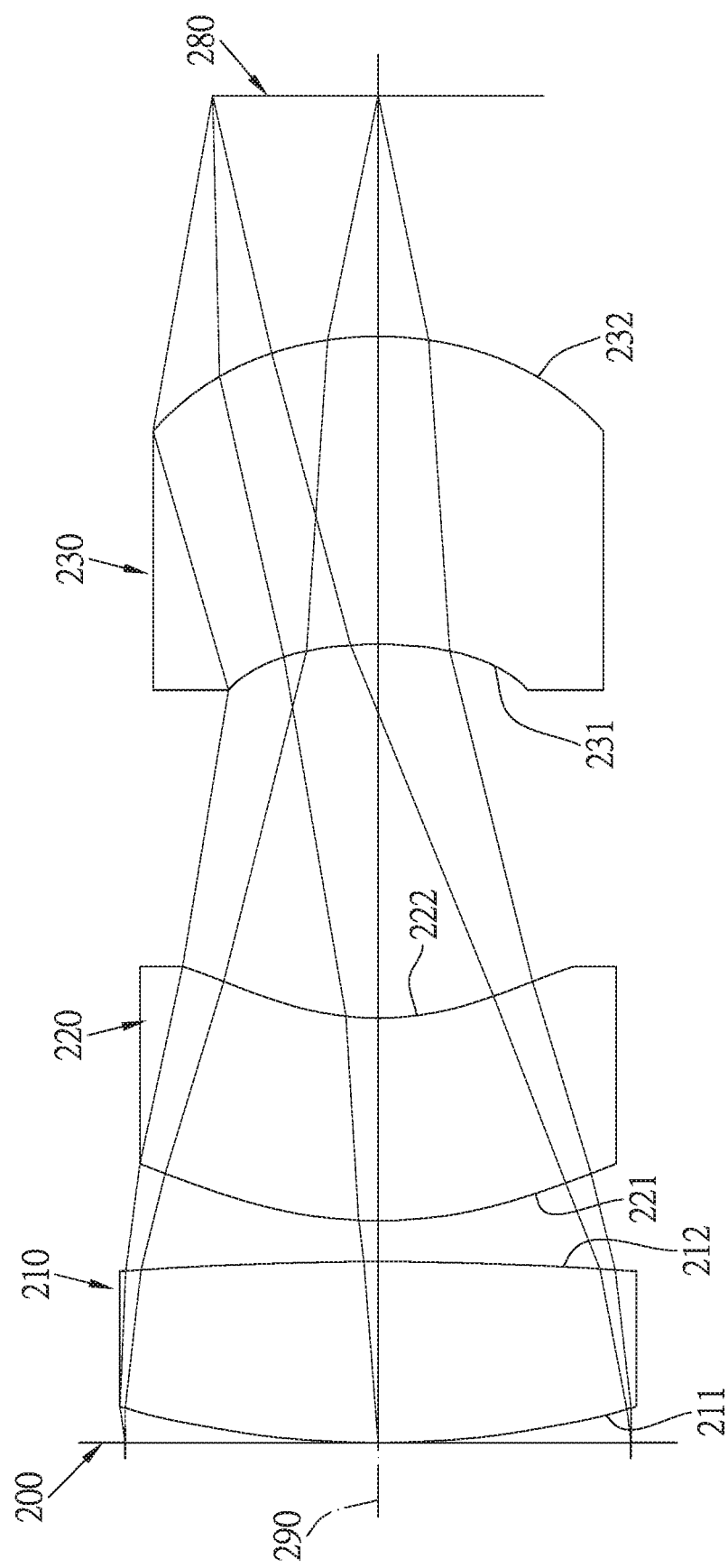
FIG. 2A shows a three-piece infrared single wavelength projection lens system in accordance with a second embodiment of the present invention.
Figure 2B:
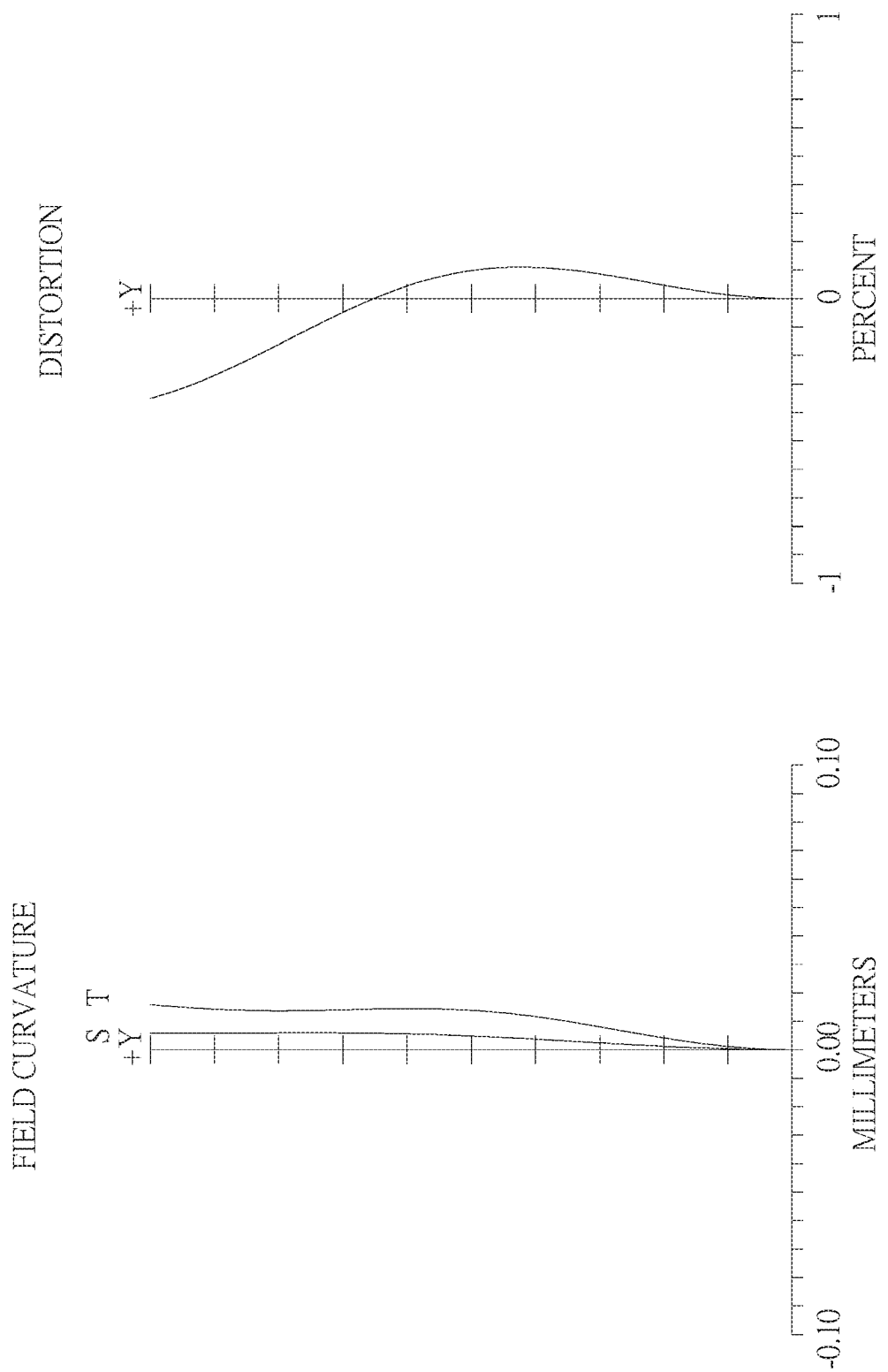
FIG. 2B shows the astigmatic field curve and the distortion curve of the second embodiment of the present invention.

Referring to FIGS. 2A and 2B, FIG. 2A shows a three-piece infrared single wavelength projection lens system in accordance with a second embodiment of the present invention, and FIG. 2B shows, in order from left to right, the astigmatic field curve and the distortion curve of the second embodiment of the present invention. A three-piece infrared single wavelength projection lens system in accordance with the second embodiment of the present invention comprises a stop 200 and a lens group. The lens group comprises, in order from an image side to an image source side: a first lens element 210, a second lens element 220, a third lens element 230, and an image source plane 280, wherein the three-piece infrared single wavelength projection lens system has a total of three lens elements with refractive power. The stop 200 is disposed before an image source-side surface 212 of the first lens element 210.

The first lens element 210 with a positive refractive power has an image-side surface 211 being convex near an optical axis 290 and the image source-side surface 212 being convex near the optical axis 290, and the first lens element 210 is made of glass.

The second lens element 220 with a negative refractive power has an image-side surface 221 being convex near the optical axis 290 and an image source-side surface 222 being concave near the optical axis 290, the image-side surface 221 and the image source-side surface 222 are aspheric, and the second lens element 220 is made of plastic material.

The third lens element 230 with a positive refractive power has an image-side surface 231 being concave near the optical axis 290 and an image source-side surface 232 being convex near the optical axis 290, the image-side surface 231 and the image source-side surface 232 are aspheric, and the third lens element 230 is made of plastic material.

The detailed optical data of the second embodiment is shown in table 3, and the aspheric surface data is shown in table 4.

TABLE 3

Embodiment 2
f(focal length) = 3.32 mm, Fno = 2.5, FOV = 15.09 deg.

| surface | | Curvature Radius | | Thickness | Material | Index | Abbe # | Focal length |
|---|---|---|---|---|---|---|---|---|
| 0 | object | infinity | | 350 | | | | |
| 1 | | infinity | | 0 | | | | |
| 2 | stop | infinity | | 0 | | | | |
| 3 | Lens 1 | 2.504 | | 0.482 | glass | 1.73 | 54.7 | 2.782 |
| 4 | | −8.949 | | 0.109 | | | | |
| 5 | Lens 2 | 1.182 | (ASP) | 0.540 | plastic | 1.65 | 21.5 | −7.129 |
| 6 | | 0.768 | (ASP) | 0.996 | | | | |
| 7 | Lens 3 | −1.143 | (ASP) | 0.821 | plastic | 1.65 | 21.5 | 3.579 |
| 8 | | −0.955 | (ASP) | 0.642 | | | | |
| 9 | Image source plane | infinity | | — | | | | |

TABLE 4

Aspheric Coefficients

| | surface | | | |
|---|---|---|---|---|
| | 5 | 6 | 7 | 8 |
| K: | −2.4885E+00 | −1.8523E−01 | 2.8552E+00 | −7.8384E−01 |
| A: | 8.0345E−02 | −4.4661E−01 | −1.0586E+00 | −3.8401E−01 |
| B: | −3.5482E−01 | −1.7071E+00 | 1.1496E+00 | −4.4262E−01 |
| C: | 5.6522E−01 | 3.0873E+00 | −3.3247E+01 | 2.3433E+00 |
| D: | −1.0230E+00 | −9.4704E+00 | 4.5713E+01 | −8.7436E+00 |
| E: | 5.1571E−01 | 1.1441E+01 | 2.1369E+02 | 1.4031E+01 |
| F: | | | −2.2801E+03 | −9.4313E+00 |

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f [mm] | 3.323 | f12/f3 | 0.843 |
| Fno | 2.5 | Vglass − Vplastic | 33.2 |
| FOV [deg.] | 15.09 | f/TL | 0.926 |
| f/f12 | 1.102 | R1/R2 | −0.280 |
| f/f23 | 0.583 | R3/R4 | 1.538 |
| f1/f2 | −0.390 | R5/R6 | 1.197 |
| f2/f3 | −1.992 | CT1/CT2 | 0.894 |
| f1/f3 | 0.777 | CT2/CT3 | 0.657 |
| f1/f23 | 0.488 | CT1/CT3 | 0.587 |

Figure 3A:
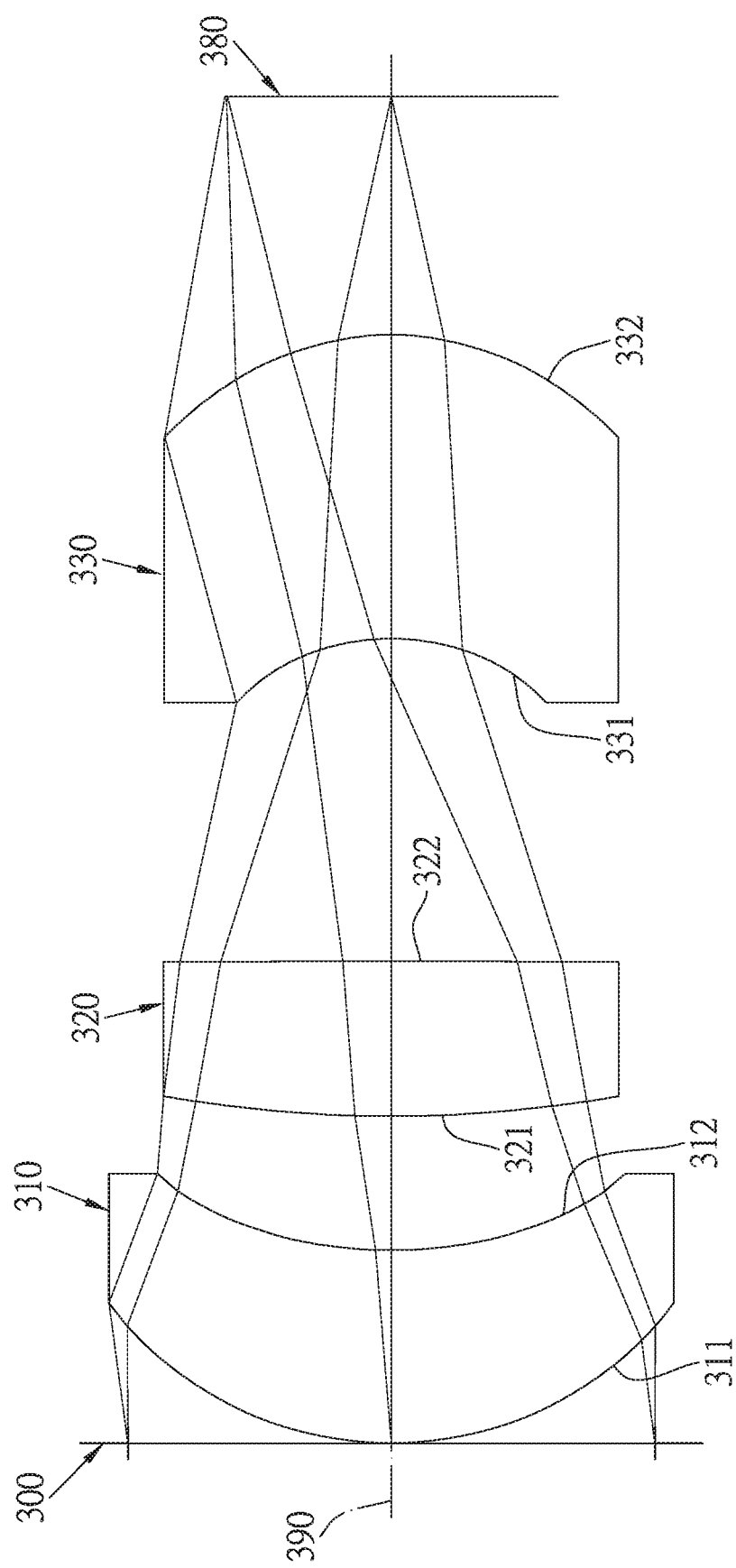
FIG. 3A shows a three-piece infrared single wavelength projection lens system in accordance with a third embodiment of the present invention.
Figure 3B:
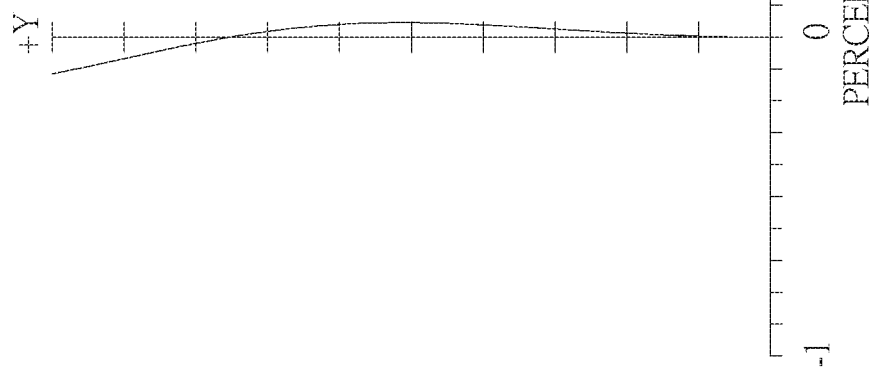
FIG. 3B shows the astigmatic field curve and the distortion curve of the third embodiment of the present invention.
Figure 3B:
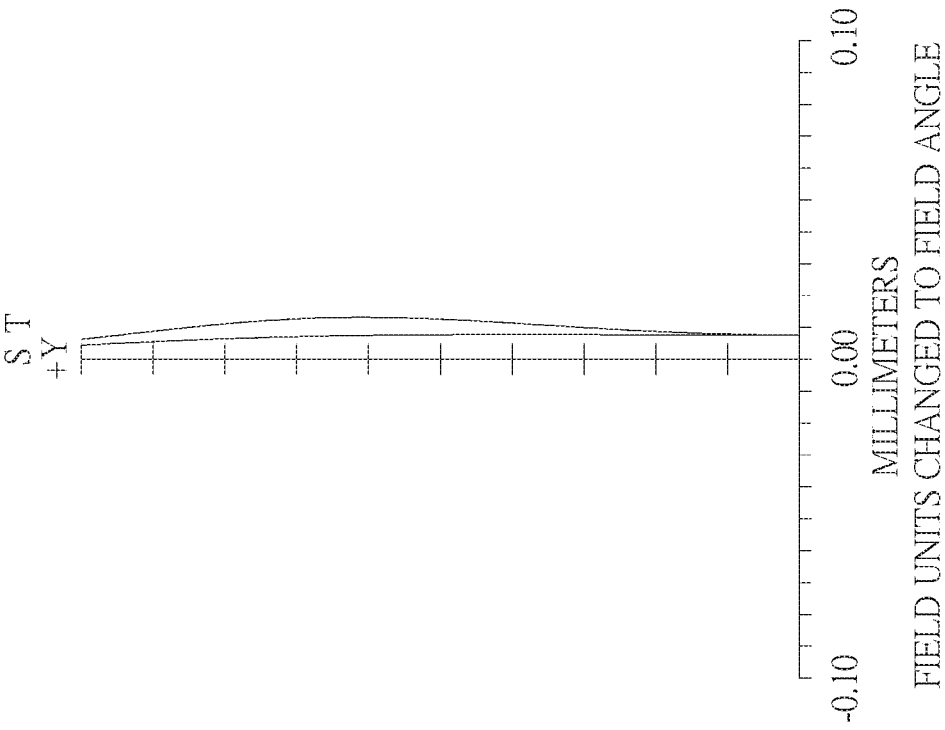

Referring to FIGS. 3A and 3B, FIG. 3A shows a three-piece infrared single wavelength projection lens system in accordance with a third embodiment of the present invention, and FIG. 3B shows, in order from left to right, the astigmatic field curve and the distortion curve of the third embodiment of the present invention. A three-piece infrared single wavelength projection lens system in accordance with the third embodiment of the present invention comprises a stop 300 and a lens group. The lens group comprises, in order from an image side to an image source side: a first lens element 310, a second lens element 320, a third lens element 330, and an image source plane 380, wherein the three-piece infrared single wavelength projection lens system has a total of three lens elements with refractive power. The stop 300 is disposed before an image source-side surface 312 of the first lens element 310.

The first lens element 310 with a positive refractive power has an image-side surface 311 being convex near an optical axis 390 and the image source-side surface 312 being concave near the optical axis 390, the image-side surface 311 and the image source-side surface 312 are aspheric, and the first lens element 310 is made of plastic material.

The second lens element 320 with a positive refractive power has an image-side surface 321 being convex near the optical axis 390 and an image source-side surface 322 being convex near the optical axis 390, and the second lens element 320 is made of glass.

The third lens element 330 with a positive refractive power has an image-side surface 331 being concave near the optical axis 390 and an image source-side surface 332 being convex near the optical axis 390, the image-side surface 331 and the image source-side surface 332 are aspheric, and the third lens element 330 is made of plastic material.

The detailed optical data of the third embodiment is shown in table 5, and the aspheric surface data is shown in table 6.

TABLE 5

Embodiment 3
f(focal length) = 3.33 mm, Fno = 2.4, FOV = 15.05 deg.

| sur-face | | Curvature Radius | Thickness | Material | Index | Abbe # | Focal length |
|---|---|---|---|---|---|---|---|
| 0 | object | infinity | 350 | | | | |
| 1 | | infinity | 0 | | | | |
| 2 | stop | infinity | 0 | | | | |
| 3 | Lens 1 | 0.947 (ASP) | 0.517 | plastic | 1.65 | 21.5 | 1.556 |
| 4 | | 1.238 (ASP) | 0.358 | | | | |
| 5 | Lens 2 | 3.498 | 0.414 | glass | 1.73 | 54.7 | 4.730 |
| 6 | | −100.011 | 0.864 | | | | |
| 7 | Lens 3 | −0.643 (ASP) | 0.812 | plastic | 1.65 | 21.5 | 4.256 |
| 8 | | −0.761 (ASP) | 0.639 | | | | |
| 9 | Image source plane | infinity | — | | | | |

TABLE 6

Aspheric Coefficients

| | surface | | | |
|---|---|---|---|---|
| | 3 | 4 | 7 | 8 |
| K: | −7.5186E−01 | 1.2090E+00 | −2.4537E+00 | −9.0426E−02 |
| A: | 1.0215E−01 | 2.9626E−02 | −1.6752E+00 | 8.7857E−02 |
| B: | 1.1310E−01 | 2.1646E−01 | −4.3526E−01 | −1.3478E−02 |
| C: | −1.9412E−01 | −1.9715E+00 | 8.0956E+00 | 7.7550E−02 |
| D: | 9.0873E−01 | 1.0572E+01 | −1.1178E+02 | 2.7927E+00 |
| E: | −1.4655E+00 | −2.4884E+01 | 2.9243E+02 | −8.7860E+00 |
| F: | 1.1967E+00 | 2.4740E+01 | −2.5658E+02 | 9.8448E+00 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f [mm] | 3.330 | f12/f3 | 0.587 |
| Fno | 2.4 | Vglass − Vplastic | 33.2 |
| FOV [deg.] | 15.05 | f/TL | 0.924 |
| f/f12 | 1.334 | R1/R2 | 0.765 |
| f/f23 | 1.021 | R3/R4 | −0.035 |
| f1/f2 | 0.329 | R5/R6 | 0.844 |
| f2/f3 | 1.111 | CT1/CT2 | 1.250 |
| f1/f3 | 0.366 | CT2/CT3 | 0.509 |
| f1/f23 | 0.477 | CT1/CT3 | 0.636 |

Figure 4A:
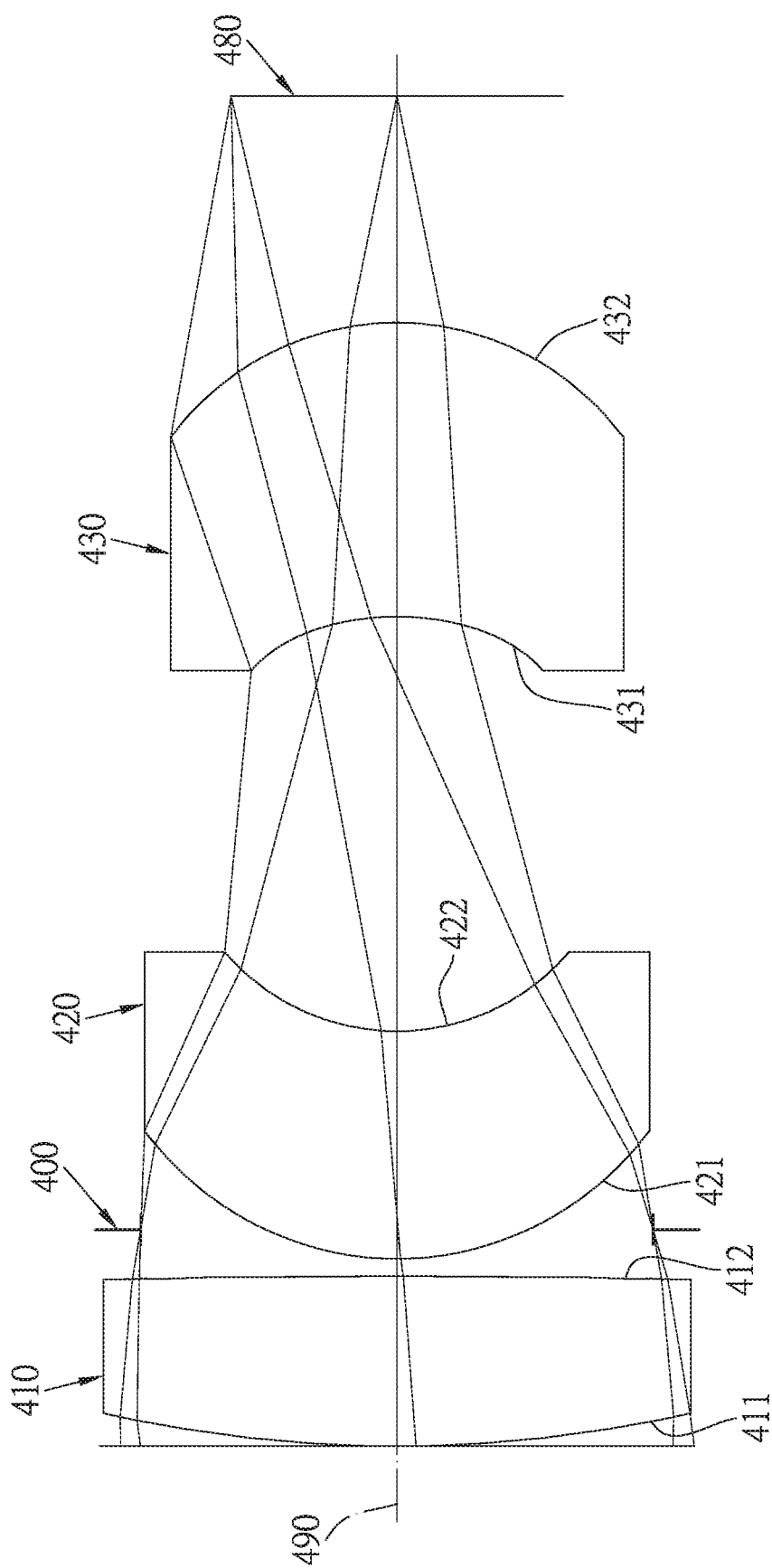
FIG. 4A shows a three-piece infrared single wavelength projection lens system in accordance with a fourth embodiment of the present invention.
Figure 4B:
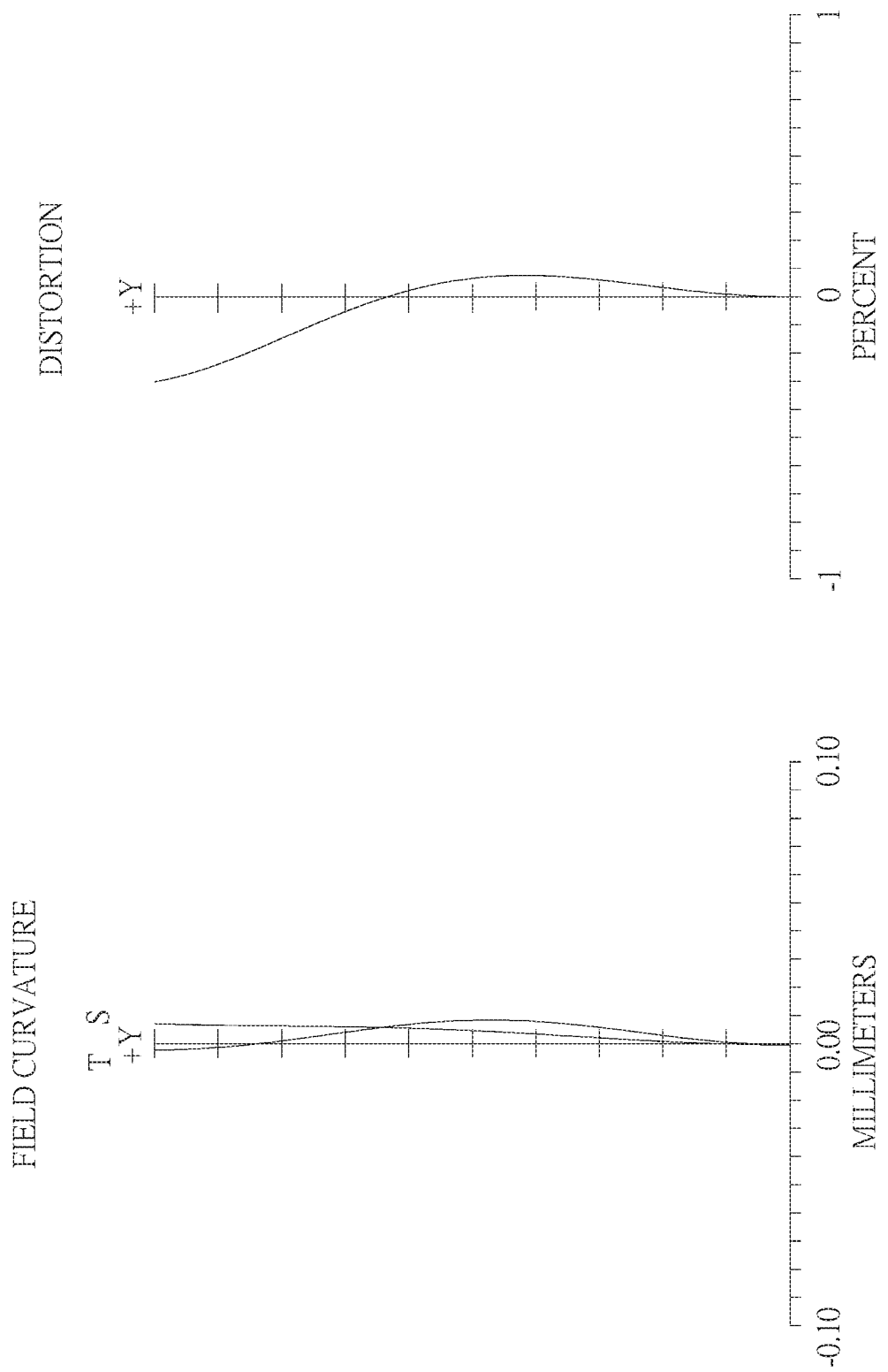
FIG. 4B shows the astigmatic field curve and the distortion curve of the fourth embodiment of the present invention.

Referring to FIGS. 4A and 4B, FIG. 4A shows a three-piece infrared single wavelength projection lens system in accordance with a fourth embodiment of the present invention, and FIG. 4B shows, in order from left to right, the astigmatic field curve and the distortion curve of the fourth embodiment of the present invention. A three-piece infrared single wavelength projection lens system in accordance with the fourth embodiment of the present invention comprises a stop 400 and a lens group. The lens group comprises, in order from an image side to an image source side: a first lens element 410, a second lens element 420, a third lens element 430, and an image source plane 480, wherein the three-piece infrared single wavelength projection lens system has a total of three lens elements with refractive power. The stop 400 is disposed between an image source-side 412 of the first lens element 410 and an image source-side surface 422 of the second lens element 420.

The first lens element 410 with a positive refractive power has an image-side surface 411 being convex near an optical axis 490 and the image source-side surface 412 being convex near the optical axis 490, and the first lens element 410 is made of glass.

The second lens element 420 with a positive refractive power has an image-side surface 421 being convex near the optical axis 490 and the image source-side surface 422 being convex near the optical axis 490, the image-side surface 421 and the image source-side surface 422 are aspheric, and the second lens element 420 is made of plastic material.

The third lens element 430 with a positive refractive power has an image-side surface 431 being concave near the optical axis 490 and an image source-side surface 432 being convex near the optical axis 490, the image-side surface 431 and the image source-side surface 432 are aspheric, and the third lens element 430 is made of plastic material.

The detailed optical data of the fourth embodiment is shown in table 7, and the aspheric surface data is shown in table 8.

TABLE 7

Embodiment 4 f(focal length) = 3.62 mm, Fno = 2.5, FOV = 13.86 deg.

| surface | | Curvature Radius | | Thickness | Material | Index | Abbe # | Focal length |
|---|---|---|---|---|---|---|---|---|
| 0 | object | infinity | | 350 | | | | |
| 1 | | infinity | | 0 | | | | |
| 2 | Lens 1 | 3.515 | | 0.451 | glass | 1.73 | 54.7 | 4.484 |
| 3 | | −35.000 | | 0.124 | | | | |
| 4 | stop | infinity | | −0.078 | | | | |
| 5 | Lens 2 | 0.815 | (ASP) | 0.606 | plastic | 1.65 | 21.5 | 50.493 |
| 6 | | −0.601 | (ASP) | 1.103 | | | | |
| 7 | Lens 3 | −0.778 | (ASP) | 0.783 | plastic | 1.65 | 21.5 | 2.867 |
| 8 | | −0.744 | (ASP) | 0.604 | | | | |
| 9 | Image source plane | infinity | | — | | | | |

TABLE 8

Aspheric Coefficients

| | surface | | | |
|---|---|---|---|---|
| | 5 | 6 | 7 | 8 |
| K: | −6.5312E−01 | 2.5817E−01 | −2.9006E+00 | −1.1581E−01 |
| A: | 1.1733E−01 | −1.8329E−01 | −2.0461E+00 | −9.2227E−02 |
| B: | 3.0884E−01 | 5.3619E−02 | 5.7686E+00 | 2.2982E−01 |
| C: | −1.3496E+00 | −5.7716E+00 | −1.1320E+02 | −1.4795E+00 |
| D: | 5.7902E+00 | 1.5989E+01 | 7.7866E+02 | 6.4399E+00 |
| E: | −1.0860E+01 | −4.3699E+01 | −3.3328E+03 | −1.4134E+01 |
| F: | 8.6301E+00 | −8.4134E+01 | 4.2249E+03 | 1.2067E+01 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f [mm] | 3.624 | f12/f3 | 1.067 |
| Fno | 2.5 | Vglass − Vplastic | 33.2 |
| FOV [deg.] | 13.86 | f/TL | 1.009 |
| f/f12 | 1.184 | R1/R2 | −0.100 |
| f/f23 | 0.923 | R3/R4 | −1.356 |
| f1/f2 | 0.089 | R5/R6 | 1.045 |
| f2/f3 | 17.609 | CT1/CT2 | 0.745 |
| f1/f3 | 1.564 | CT2/CT3 | 0.774 |
| f1/f23 | 1.142 | CT1/CT3 | 0.577 |

Figure 5A:
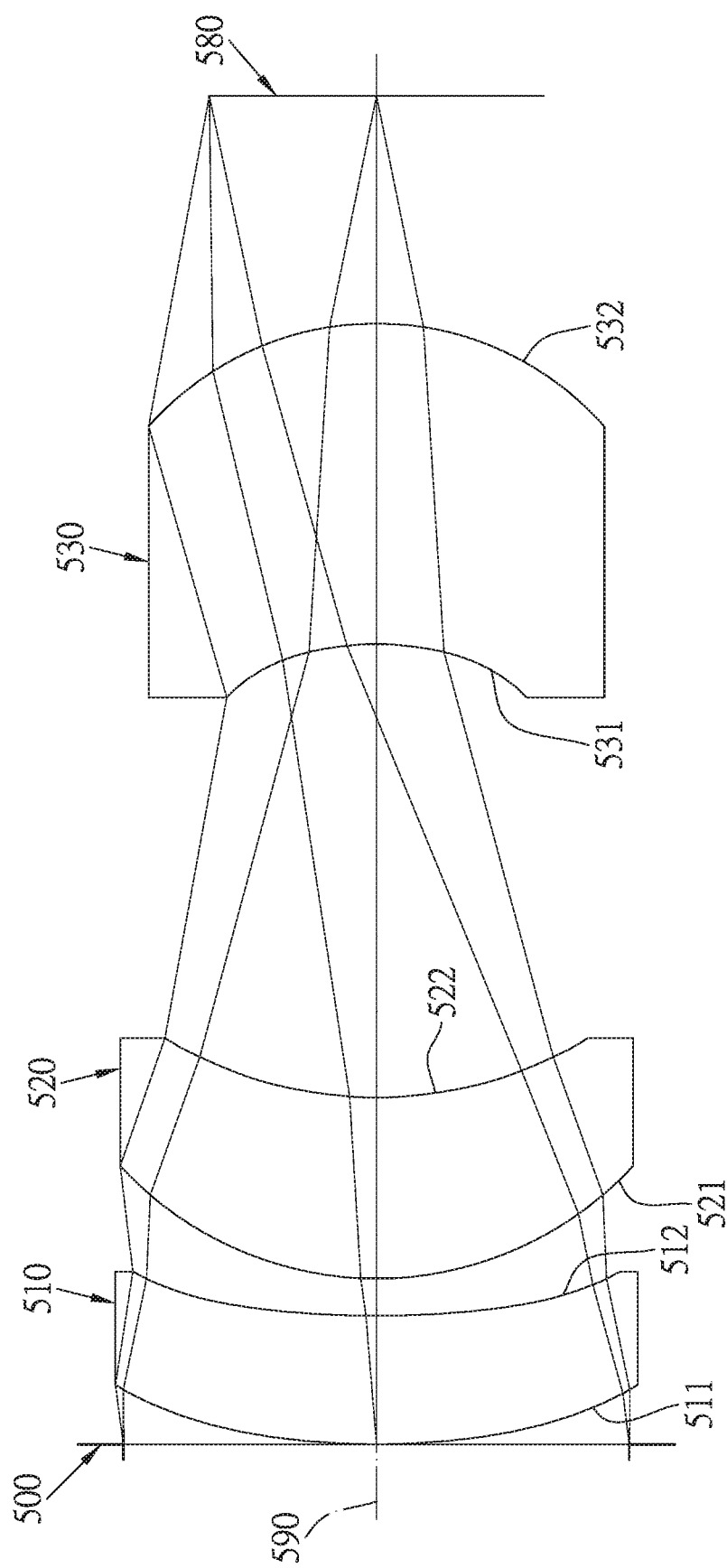
FIG. 5A shows a three-piece infrared single wavelength projection lens system in accordance with a fifth embodiment of the present invention.
Figure 5B:
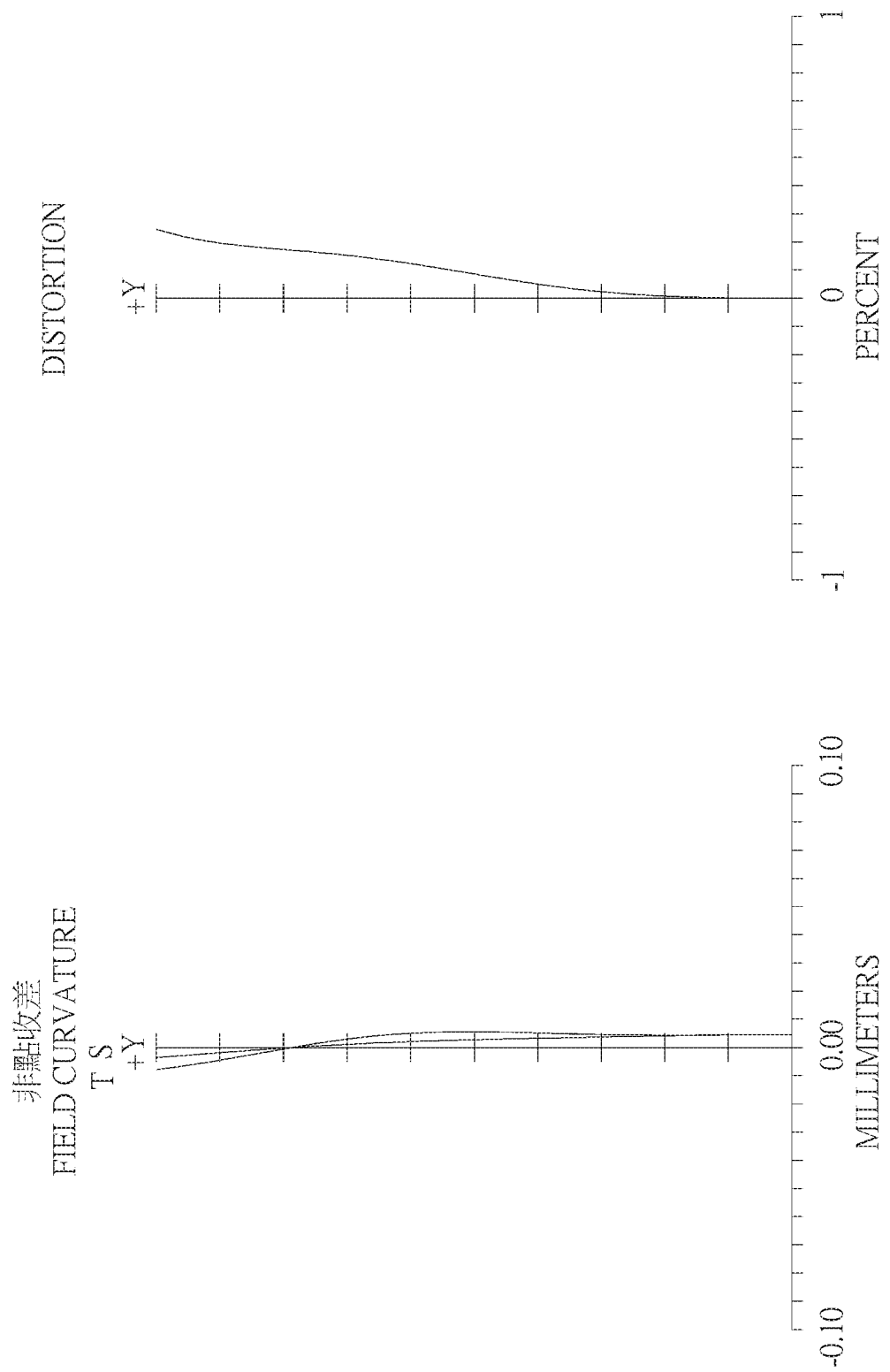
FIG. 5B shows the astigmatic field curve and the distortion curve of the fifth embodiment of the present invention.

Referring to FIGS. 5A and 5B, FIG. 5A shows a three-piece infrared single wavelength projection lens system in accordance with a fifth embodiment of the present invention, and FIG. 5B shows, in order from left to right, the astigmatic field curve and the distortion curve of the fifth embodiment of the present invention. A three-piece infrared single wavelength projection lens system in accordance with the fifth embodiment of the present invention comprises a stop 500 and a lens group. The lens group comprises, in order from an image side to an image source side: a first lens element 510, a second lens element 520, a third lens element 530, and an image source plane 580, wherein the three-piece infrared single wavelength projection lens system has a total of three lens elements with refractive power. The stop 500 is disposed before an image source-side surface 512 of the first lens element 510.

The first lens element 510 with a positive refractive power has an image-side surface 511 being convex near an optical axis 590 and the image source-side surface 512 being concave near the optical axis 590, the image-side surface 511 and the image source-side surface 512 are aspheric, and the first lens element 510 is made of plastic material.

The second lens element 520 with a positive refractive power has an image-side surface 521 being convex near the optical axis 590 and an image source-side surface 522 being concave near the optical axis 590, and the second lens element 520 is made of glass.

The third lens element 530 with a positive refractive power has an image-side surface 531 being concave near the optical axis 590 and an image source-side surface 532 being convex near the optical axis 590, the image-side surface 531 and the image source-side surface 532 are aspheric, and the third lens element 530 is made of plastic material.

The detailed optical data of the fifth embodiment is shown in table 9, and the aspheric surface data is shown in table 10.

TABLE 9

Embodiment 5
f(focal length) = 3.32 mm, Fno = 2.5, FOV = 15.03 deg.

| surface | | Curvature Radius | | Thickness | Material | Index | Abbe # | Focal length |
|---|---|---|---|---|---|---|---|---|
| 0 | object | infinity | | 350 | | | | |
| 1 | | infinity | | 0 | | | | |
| 2 | stop | infinity | | 0 | | | | |
| 3 | Lens 1 | 2.007 | (ASP) | 0.339 | plastic | 1.65 | 21.5 | 3.285 |
| 4 | | 2.870 | (ASP) | 0.098 | | | | |
| 5 | Lens 2 | 0.915 | | 0.477 | glass | 1.73 | 54.7 | 3.879 |
| 6 | | 1.068 | | 1.195 | | | | |
| 7 | Lens 3 | −0.822 | (ASP) | 0.845 | plastic | 1.65 | 21.5 | 3.151 |
| 8 | | −0.801 | (ASP) | 0.600 | | | | |
| 9 | Image source plane | infinity | | — | | | | |

TABLE 10

Aspheric Coefficients

| | surface | | | |
|---|---|---|---|---|
| | 3 | 4 | 7 | 8 |
| K: | −4.2700E−01 | 8.6277E+00 | −9.8914E+00 | −1.1397E−01 |
| A: | 7.2570E−02 | 6.3908E−02 | −3.1655E+00 | −5.7074E−02 |
| B: | 6.3574E−01 | 1.0942E+00 | 7.6637E+00 | −4.4205E−02 |
| C: | −3.1342E+00 | −6.5774E+00 | −3.2235E+01 | −1.4866E−01 |
| D: | 9.2565E+00 | 2.3184E+01 | −2.3306E+02 | 1.7859E+00 |
| E: | −1.3418E+01 | −4.0105E+01 | 2.1868E+03 | −4.3121E+00 |
| F: | 7.8435E+00 | 2.8312E+01 | −6.6006E+03 | 3.2120E+00 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f [mm] | 3.324 | f12/f3 | 0.873 |
| Fno | 2.5 | Vglass − Vplastic | 33.2 |
| FOV [deg.] | 15.03 | f/TL | 0.936 |
| f/f12 | 1.208 | R1/R2 | 0.699 |
| f/f23 | 1.015 | R3/R4 | 0.857 |
| f1/f2 | 0.847 | R5/R6 | 1.027 |
| f2/f3 | 1.231 | CT1/CT2 | 0.711 |
| f1/f3 | 1.042 | CT2/CT3 | 0.564 |
| f1/f23 | 1.003 | CT1/CT3 | 0.401 |

In the present three-piece infrared single wavelength projection lens system, the lens elements can be made of plastic or glass. If the lens elements are made of plastic, the cost will be effectively reduced. If the lens elements are made of glass, there is more freedom in distributing the refractive power of the three-piece infrared single wavelength projection lens system. Plastic lens elements can have aspheric surfaces, which allow more design parameter freedom (than spherical surfaces), so as to reduce the aberration and the number of the lens elements, as well as the total track length of the three-piece infrared single wavelength projection lens system.

In the present three-piece infrared single wavelength projection lens system, if the image-side or the image source-side surface of the lens elements with refractive power is convex and the location of the convex surface is not defined, the image-side or the image source-side surface of the lens elements near the optical axis is convex. If the image-side or the image source-side surface of the lens elements is concave and the location of the concave surface is not defined, the image-side or the image source-side surface of the lens elements near the optical axis is concave.

While we have shown and described various embodiments in accordance with the present invention, it should be clear to those skilled in the art that further embodiments may be made without departing from the scope of the present invention.

What is claimed is:

1. A three-piece infrared single wavelength projection lens system, in order from an image side to an image source side, comprising:
   a first lens element with a positive refractive power, having an image-side surface being convex near an optical axis;
   a second lens element with a refractive power, having an image-side surface being convex near the optical axis;
   a third lens element with a positive refractive power, having an image-side surface being concave near the optical axis and an image source-side surface being convex near the optical axis, at least one of the image-side surface and the image source-side surface of the first lens element being aspheric;
   a stop disposed before an image source-side surface of the first lens element or between the image source-side surface of the first lens element and an image source-side surface of the second lens element; and
   wherein the first lens element or the second lens element is made of glass.

2. The three-piece infrared single wavelength projection lens system as claimed in claim 1, wherein a focal length of the three-piece infrared single wavelength projection lens system is f, a focal length of the first lens element and the second lens element combined is f12, and they satisfy the relation: 0.8<f/f12<1.5.

3. The three-piece infrared single wavelength projection lens system as claimed in claim 1, wherein a focal length of the three-piece infrared single wavelength projection lens system is f, a focal length of the second lens element and the third lens element combined is f23, and they satisfy the relation: 0.1<f/f23<1.3.

4. The three-piece infrared single wavelength projection lens system as claimed in claim 1, wherein a focal length of the first lens element is f1, a focal length of the second lens element is f2, and they satisfy the relation: −0.5<f1/f2<0.7.

5. The three-piece infrared single wavelength projection lens system as claimed in claim 1, wherein a focal length of the first lens element is f1, the focal length of the third lens element is f3, and they satisfy the relation: 0.1<f1/f3<1.8.

6. The three-piece infrared single wavelength projection lens system as claimed in claim 1, wherein a focal length of the first lens element is f1, a focal length of the second lens element and the third lens element combined is f23, and they satisfy the relation: 0.1<f1/f23<1.3.

7. The three-piece infrared single wavelength projection lens system as claimed in claim 1, wherein a focal length of the first lens element and the second lens element combined is f12, a focal length of the third lens element is f3, and they satisfy the relation: 0.2<f12/f3<1.4.

8. The three-piece infrared single wavelength projection lens system as claimed in claim 1, wherein a radius of curvature of the image-side surface of the first lens element is R1, a radius of curvature of the image source-side surface of the first lens element is R2, and they satisfy the relation: −0.8<R1/R2<1.1.

9. The three-piece infrared single wavelength projection lens system as claimed in claim 1, wherein a radius of curvature of the image-side surface of the second lens element is R3, a radius of curvature of the image source-side surface of the second lens element is R4, and they satisfy the relation: −1.7<R3/R4<1.9.

10. The three-piece infrared single wavelength projection lens system as claimed in claim 1, wherein a radius of curvature of the image-side surface of the third lens element is R5, a radius of curvature of the image source-side surface of the third lens element is R6, and they satisfy the relation: 0.4<R5/R6<1.2.

11. The three-piece infrared single wavelength projection lens system as claimed in claim 1, wherein a central thickness of the first lens element along the optical axis is CT1, a central thickness of the second lens element along the optical axis is CT2, and they satisfy the relation: 0.3<CT1/CT2<1.8.

12. The three-piece infrared single wavelength projection lens system as claimed in claim 1, wherein a central thickness of the second lens element along the optical axis is CT2, a central thickness of the third lens element along the optical axis is CT3, and they satisfy the relation: 0.2<CT2/CT3<1.0.

13. The three-piece infrared single wavelength projection lens system as claimed in claim 1, wherein a central thickness of the first lens element along the optical axis is CT1, a central thickness of the third lens element along the optical axis is CT3, and they satisfy the relation: 0.1<CT1/CT3<1.1.

14. The three-piece infrared single wavelength projection lens system as claimed in claim 1, wherein a focal length of the three-piece infrared single wavelength projection lens system is f, a distance from the image-side surface of the first lens element to an image plane along the optical axis is TL, and they satisfy the relation: 0.7<f/TL<1.2.

15. The three-piece infrared single wavelength projection lens system as claimed in claim 1, wherein a refractive index of the first lens element or the second lens element which is made of glass is nglass, a refractive index of the first lens element or the second lens element which is made of plastic is nplastic, and they satisfy the relations: nglass>1.7 and nplastic>1.6.

16. The three-piece infrared single wavelength projection lens system as claimed in claim 1, wherein an Abbe number of the first lens element or the second lens element which is made of glass is Vglass, an Abbe number of the first lens element or the second lens element which is made of plastic is Vplastic, and they satisfy the relation: 23<Vglass-Vplastic<43.

\* \* \* \* \*